April 3, 1934.  M. KESSLER  1,953,858
TRUNK STRUCTURE AND MOUNTING
Filed May 29, 1933  2 Sheets-Sheet 1

Witness
H. S. Menzenmaier

Inventor
Martin Kessler
By Bair, Freeman & Sinclair
Attorneys

April 3, 1934. M. KESSLER 1,953,858
TRUNK STRUCTURE AND MOUNTING
Filed May 29, 1933 2 Sheets-Sheet 2
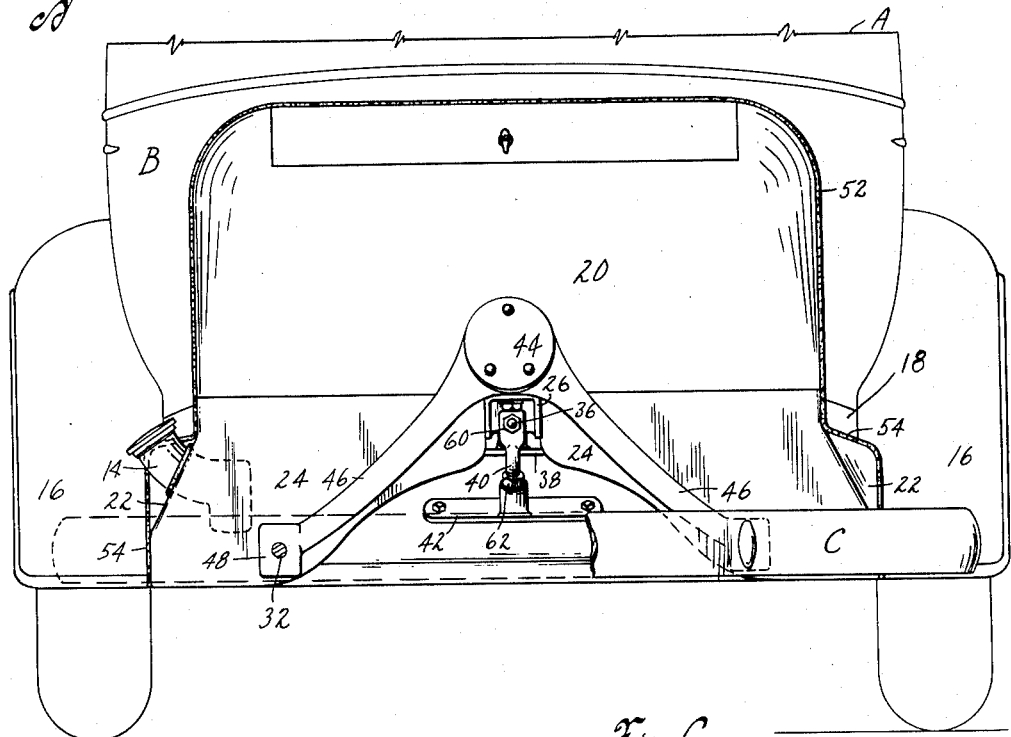
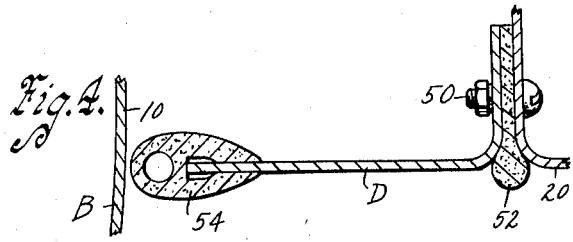
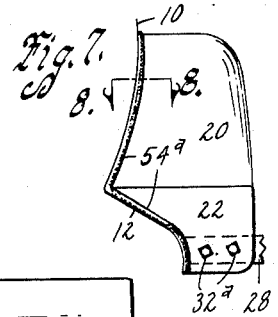
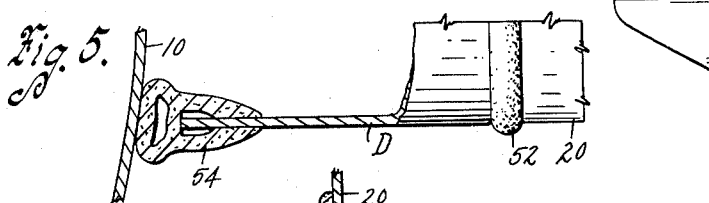
Inventor
~ Martin Kessler ~
by Bair, Freeman & Sinclair
Attorneys
Witness Patented Apr. 3, 1934

1,953,858

UNITED STATES PATENT OFFICE 1,953,858

TRUNK STRUCTURE AND MOUNTING

Martin Kessler, Cleveland, Ohio, assignor to The Gabriel Company, Cleveland, Ohio, a corporation of Ohio Application May 29, 1933, Serial No. 673,451

9 Claims. (Cl. 224—29)

An object of my invention is to provide a trunk structure and a mounting therefor which are comparatively simple and inexpensive to manufacture.

More particularly, it is my object to provide means for mounting a trunk of standardized design in form fitting relation upon stock automobile bodies of different types and makes without alteration of the bodies or their panels and whereby the trunk and its mounting will have the appearance of being built into the bodies as integral or original parts thereof and will be maintained in such intimate association with the bodies as to eliminate all "weaving" action or any relative motion with respect to the bodies.

A further object is to provide a trunk structure supported by initially movable means adjacent the body of an automobile or the like and to interpose between the trunk and the body, a form fitting skirt which snugly follows the contour of the body, means being provided for drawing the initially movable or loose supporting means toward the body for thus rendering the supporting means rigid and also effectively maintaining the skirt engaged with the body without the necessity of having to extend anchorage for the trunk through the body itself.

A further object is to provide tie rod means for placing a trunk support under tension and thus maintaining the trunk in form fitting relation to a vehicle body.

Still another object is to provide a trunk structure which apparently is an integral part of the automobile body, the effect being accomplished by the use of a form fitting skirt having a resilient edge engaging the body and having the appearance of a molding, the skirt being separate from the trunk whereby one style of trunk may be associated with different shapes of vehicle bodies and the form fitting feature can be accomplished by providing a skirt of the proper shape to fit the contour of the body.

A still further object is to eliminate the necessity of mutilating the automobile body for holding the skirt in contact therewith, this means consisting of supporting mechanism which draws the trunk toward the body without passing through the body itself and thereby tending to distort it unless additional bracing or brackets are installed inside the body.

A still further object is to provide supporting means for a trunk and tire carrier which is adjustable for placing the supporting means under tension to rigidly support both the trunk and the tire carrier and also maintain a form fitting skirt interposed between the trunk and the body of the automobile in compression contact with the body.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 3 is a rear elevation of Figure 1.

Figure 4 is an enlarged fragmentary sectional view on the line 4—4 of Figure 2 showing the trunk and form fitting skirt in the process of being associated with the car body.

Figure 5 is a somewhat similar view showing the parts after the association is completed.

Figure 6 is a side elevation of a modified shape of form fitting skirt usable with the trunk and its supporting means in Figure 2.

Figure 7 is a side elevation illustrating the trunk itself fitting the car body; and Figure 8 is an enlarged fragmentary sectional view on the line 8—8 of Figure 7.

Figure 1:
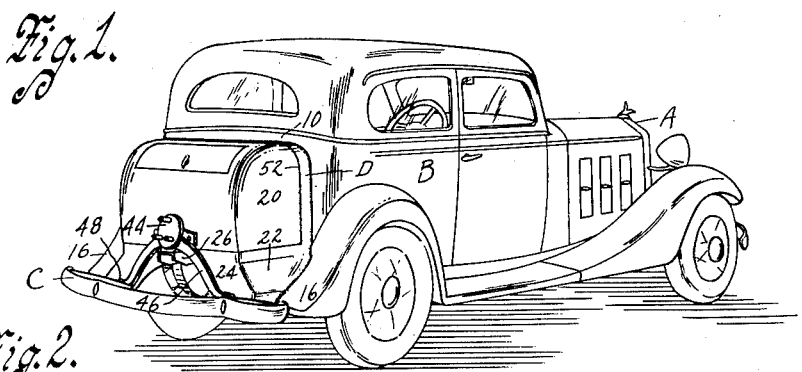
Figure 1 is a perspective view of an automobile with my trunk structure and mounting means supported thereon.

On the accompanying drawings, I have used the reference character A to indicate generally an automobile. The automobile A has a body B, the rear wall of which is indicated at 10. The rear wall 10 is illustrated as sloping downwardly and rearwardly at 12 to cover the gasoline tank of the automobile, the filler spout of which is indicated at 14. Although I am describing one type of automobile, it is to be understood that my trunk structure can be applied to bodies having different shapes than the one illustrated. The rear fenders of the automobile A are indicated at 16. The fenders 16 have fender aprons 18.

Figure 2:
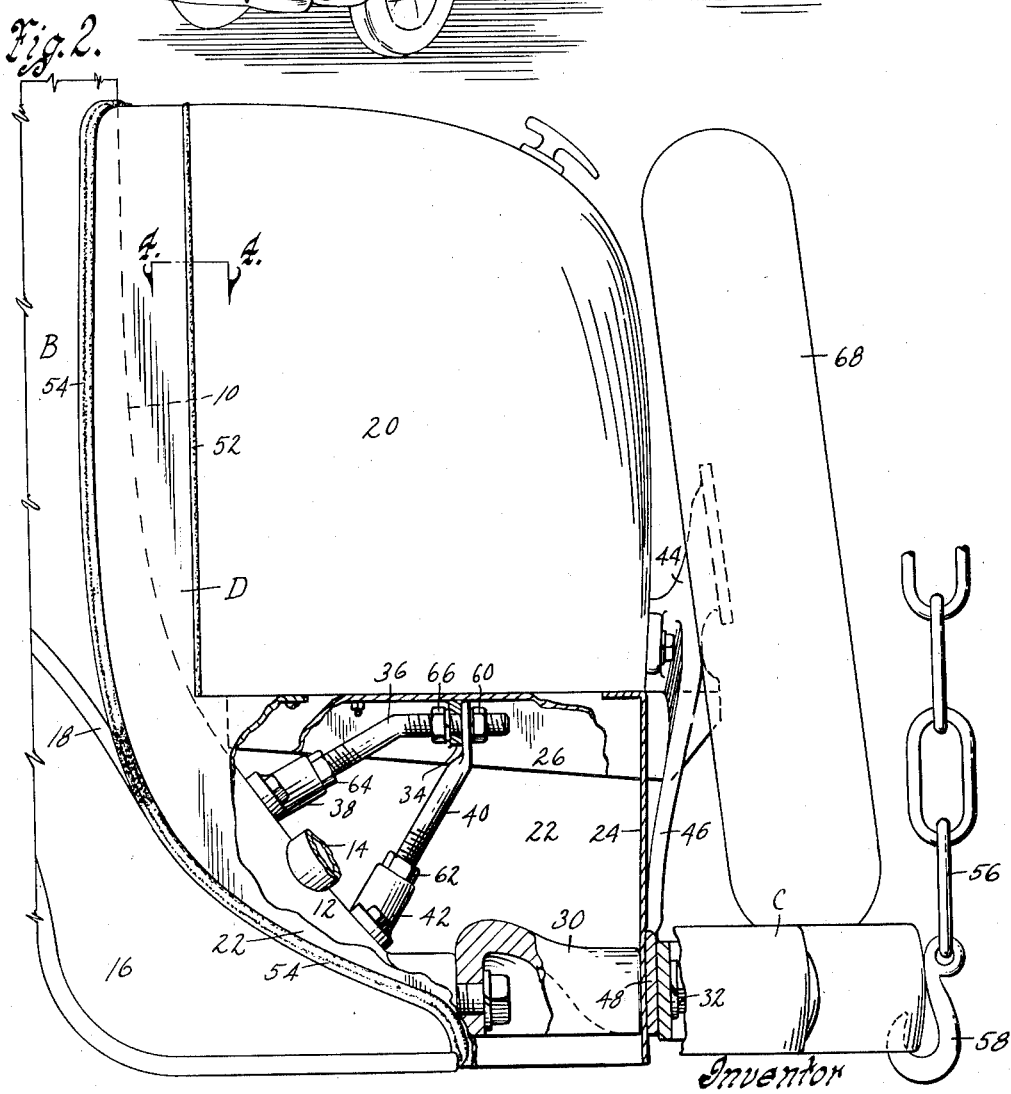
Figure 2 is a side elevation of the same, parts being broken away and other parts being shown in section to illustrate the relationship of parts.

My invention comprises a trunk 20 which may be of any suitable construction, either of the ordinary type or of the extension type, such as illustrated in the Arndt patent, Reissue No. 16,665, dated June 28, 1927. The trunk 20 when mounted on the automobile will have its back wall lying adjacent to the rear wall of the automobile body. I provide supporting means for the trunk 20 which includes side aprons 22, a rear apron 24 and a central channel bar 26. The side aprons 22 may be secured to bumper bars 28 (see Figure 7) or bumper extension bars, if the same are found necessary, or as shown in Figure 2, the rear apron 24 may be secured to bumper extension brackets 30. The bumper of the automobile is indicated at C and it is secured by bolts 32 to the bumper extension brackets 30.

The channel bar 26 is provided with an ear 34 through which one end of a tie rod 36 extends. The other end of the tie rod is threaded in a bracket 38.

An eye rod 40 has an eye at its upper end encircling the tie rod 36 and its other end threaded in a bracket 42. The brackets 38 and 42, as illustrated, are secured to the portion 12 of the automobile body B, a tire carrier originally being supported on this surface and the brackets 38 and 42 being carried by the fittings for the tire carrier. On some automobiles, the forward end of the tie rod 36 can be threaded directly into a threaded opening or fitting into which originally a bolt of a tire carrier or the like extended and the bracket 38 thus eliminated.

As an additional support for the channel bar 26, I have shown a tire carrier bracket 44 having arms 46 diverging downwardly and having their lower ends, indicated at 48, interposed between the rear apron 24 and the bumper C, the bumper extensions 30 thus supporting the tire carrier bracket 44.

In manufacturing trunks for different styles of automobile bodies, the edges of the back of the trunk can be shaped to the same contour as the rear of the body, as shown in Figure 7, if desired, so that they thus apparently are an integral part of the body. This would necessitate many different dies for the different contours of body and I therefore provide a skirt D having one edge connected with the trunk 20 and its other edge formed to the contour of the body B. Thus one shape of trunk can be used on all shapes of bodies, merely necessitating the use of skirts D of different shape along their forward and bottom edges.

The skirt D is secured to the trunk 20 in any desired manner, such as illustrated in Figure 4 wherein bolts 50 are illustrated for the purpose of securing the two together. An antisqueek strip 52 of resilient material, such as rubber, is interposed between the skirt and the back of the trunk to prevent squeeks at this point. The forward edge of the skirt D is preferably provided with a bead 54 of resilient material, such as rubber, so as to provide for any slight irregularity between the contour of the forward edge of the skirt D and the contour of the rear of the body B. Also, the bead being placed under compression, as in Figure 5, will permit minute variations in the distance between the trunk and the car body without opening any cracks through which rain can run or dust can settle.

The skirt is formed to fit the body B, the fender apron 18 and the fender 16 of the automobile, as shown in the various views of the drawings, so as to form fit these parts throughout the length of the edge of the skirt. As shown in Figure 6, the bead indicated at 54a can be of a different shape and secured directly to the trunk rather than using an apron for this purpose.

Whether or not the apron D is used there is a problem presented when it is necessary to mount the trunk on the vehicle and keep the beads 54 or 54a in contact therewith, yet prevent chattering of the skirt D against the body. The chattering of course is eliminated by using the resilient bead 54 or 54a which also eliminates marring of the body so that the trunk can be removed without the surface of the body having been defaced.

If means is extended through the back wall of the trunk and the rear wall of the body B, such as bolts or the like, this would serve to hold the bead 54 engaged with the body, but would deface the body where the holes for the bolts went through and would also necessitate reinforcement of some kind inside the body to prevent bending of the rear wall thereof when the bolts are tightened.

The provision of a trunk mounting such as described herein eliminates the necessity of boring holes in the panel at the rear of the automobile body or in otherwise injuring or marring the body. The trunk mounting contemplated by the present invention is of such character that it may be applied to the automobile without permanently changing the parts thereof; wherefore, if it is desired to remove the mounting the automobile will be in the same condition as it was originally.

The mounting or support is initially movably or loosely connected to the automobile; that is, the bolts connecting the parts 30 to the frame of the automobile are only loosely screwed into position while the nuts on the tie-rod 36 and eye-rod 40 are loosely adjusted. The support can then be raised and pushed forward towards the rear of the automobile body, since the support as a whole will fulcrum about the securing bolts for the parts 30. This raising and pushing forward of the support as a whole may be accomplished in any desired way, that is, either by hand or by means of a block and tackle, the chain and hook of which are indicated at 56 and 58, or by means of a jack placed under the bumper C. Whichever way the raising and forward movement of the support is accomplished, it will be noted that the forward edge of the skirt D will move into tight engagement with the rear of the body B.

When the parts are thus positioned as above stated, a nut 60 on the tie rod 36 can be tightened, after which lock nuts 62, 64 and 66 and the securing means for the parts 30 can be tightened for holding the parts rigid and under tension and the bead 54 under compression, as in Figure 5.

Thereafter, the hook 58 or the jack, as the case may be, is removed.

The tie rod 36 therefore is quite important as a means for holding the skirt D in contour engagement with the body B. This is especially necessary where a spare tire 68 is carried in addition to the trunk 20 and whatever luggage may be in it. Means other than the tie rod 36 can be used for pulling the trunk supporting mechnism forwardly, the prime requisite being that such means should be adjustable and should be attachable to some part of the automobile which can accommodate it without boring or tapping additional holes before installing the trunk.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A mounting for an automobile trunk comprising a support adapted to be secured to an automobile frame and provided with a portion upon which the bottom of the trunk may be secured and with a portion to which the back of the trunk may be secured and which form apparent extensions of the trunk and are adapted to span the space between it and the rear of the automobile body, said portions of the support having edges formed to the contour of the adjacent part of the automobile body and adapted to engage the same, and adjustable means connected with the support when the trunk is mounted thereon and located below the level of a portion of the bottom of the trunk and adapted to be connected to the automobile for drawing said edges of said portions tightly against the body and for maintaining a pressure engagement therebetween.

2. In combination with a vehicle having a frame, a body thereon, and means at the rear of the vehicle for securing a spare tire carrier thereto; a trunk; and a mounting for said trunk; said mounting comprising a support provided with a portion to which the bottom of the trunk is secured and a portion to which the back of the trunk is secured and which form apparent extensions of the trunk and span the space between it and the rear of the automobile body, said support having its edge adjacent to the automobile body formed to the contour thereof, means for initially loosely connecting said support to said frame and for finally rigidly connecting it thereto, and adjustable means connected with said first named means and with said support below the bottom edge of the back of the trunk for drawing said edge of said support tightly against the body when the support is loosely connected to the frame and for maintaining a pressure engagement therebetween after the support and frame are rigidly connected.

3. In combination, an automobile trunk and a mounting therefor, said mounting comprising a support adapted to be secured to an automobile frame and including portions forming apparent extensions of the trunk and adapted to span the space between the trunk and the rear of the automobile body, said portions having the bottom and the back of the trunk secured thereto and being provided with edges formed to the contour of the adjacent part of the automobile body and adapted to engage the same, and means connecting the support to the automobile at a point below the level of the bottom edge of the back of the trunk and acting to draw said edges of said portions tightly against the automobile body and maintain a pressure engagement therebetween.

4. A combined automobile trunk and mounting and means for connecting the same to the automobile frame, said trunk and mounting comprising metal panels located at the sides and rear of the trunk and having the bottom of the trunk secured thereto, said panels extending below the trunk bottom and forming an apparent continuation of the trunk, the forward edges of the side panels and forward portions of the trunk being formed to the contour of the adjacent part of the automobile body, and adjustable means between said side panels and below a portion of the bottom of the trunk for additionally connecting the trunk and mounting with the automobile and acting to draw the forward edges of the side panels and forward portions of the trunk tightly against the automobile body and maintain a pressure engagement therebetween.

5. In combination with a vehicle having a frame and a body thereon; a trunk; and a mounting for the trunk, said mounting comprising a support including a portion upon which the bottom of the trunk is secured and forming an apparent continuation of the trunk, said portion extending between the trunk and a portion of the rear of the body and having an edge fitting the contour of said body, and adjustable means connected to the vehicle below the level of the bottom of the trunk and acting to draw said edge of said portion of said support tightly against the body.

6. A mounting for an automobile trunk comprising a support adapted to be secured to an automobile frame and provided with a portion upon which the bottom of the trunk may be secured and with a portion to which the back of the trunk may be secured and which form apparent extensions of the trunk and are adapted to span the space between it and the rear of the automobile body, said portions of the support having edges formed to the contour of the adjacent part of the automobile body, compressible beads arranged on said edges and adapted to engage the body, and means connecting the support to the automobile at a point below the level of the bottom edge of the back of the trunk and acting to draw said edges of said portions toward said body and said beads tightly against the automobile body and hold the same in compression engagement therewith.

7. In combination, an automobile trunk and a mounting therefor, said mounting comprising a support adapted to be secured to an automobile frame and including members forming apparent extensions of the trunk and located at the sides and rear of the support and having portions to which the bottom of the trunk is secured, the forward edges of the side members and portions of the trunk being formed to the contour of the adjacent part of the automobile body, compressible beads arranged on said forward edges and on said portions of the trunk, and means between said side members connecting said support to the automobile at a point below the level of the bottom edge of the back of the trunk and acting to draw the forward edges of the side members and the forward portions of the trunk toward the automobile body and hold the said beads tightly against the automobile body in compression engagement therewith.

8. A mounting for an automobile trunk comprising a support adapted to be secured to an automobile frame and provided with a portion upon which the bottom of the trunk may be secured and with a portion to which the back of the trunk may be secured and which form apparent extensions of the trunk and are adapted to span the space between it and the rear of the automobile body, said portions of the support having edges formed to the contour of the adjacent part of the automobile body and adapted to engage the same, and a tie-rod connected with the support when the trunk is mounted thereon and located below the level of a portion of the bottom of the trunk and adapted to be connected with a fitting arranged on the automobile for the spare tire carrier for drawing said edges tightly against the body and for maintaining a pressure engagement therebetween.

9. In combination with a vehicle having a frame, a body thereon, and means at the rear of the vehicle for securing a spare tire carrier thereto; a trunk; and a mounting for said trunk; said mounting comprising a support provided with a portion to which the bottom of the trunk is secured and a portion to which the back is secured and which form apparent extensions of the trunk and span the space between it and the rear of the automobile body, said support having its edge adjacent to the automobile body formed to the contour thereof, means for initially loosely connecting said support to said frame and for finally rigidly connecting it thereto, and a tie-rod connected with said support below the bottom edge of the back of the trunk and with said first named means for drawing said edge of said support tightly against the body when the support is loosely connected to the frame and for maintaining a pressure engagement therebetween after the support and frame are rigidly connected.

MARTIN KESSLER.